United States Patent [19]

Shintani

[11] Patent Number: 5,486,889
[45] Date of Patent: Jan. 23, 1996

[54] LENS BARRIER MECHANISM FOR USE IN A CAMERA

[75] Inventor: Dai Shintani, Sakai, Japan

[73] Assignee: Minolta Camera Kabushiki Kaisha, Osaka, Japan

[21] Appl. No.: 274,444

[22] Filed: Jul. 13, 1994

[30] Foreign Application Priority Data

Jul. 14, 1993 [JP] Japan .................................. 5-173887

[51] Int. Cl.$^6$ ...................................... G03B 17/00
[52] U.S. Cl. ........................................... 354/202; 359/511
[58] Field of Search ........................... 354/202; 359/511

[56] References Cited

U.S. PATENT DOCUMENTS 4,410,253  10/1983  Tsuboi .
4,595,268  6/1986  Tsuboi .

FOREIGN PATENT DOCUMENTS 4-18828  2/1992  Japan .
5-27302  2/1993  Japan .

*Primary Examiner*—Monroe H. Hayes
*Attorney, Agent, or Firm*—Burns, Doane, Swecker & Mathis

[57] ABSTRACT

Two barrier blades, a barrier interlocking plate and a barrier driver plate are arranged on a base to overlap one another. A first spring is arranged between the barrier interlocking plate and the barrier driver plate. By over-charging the first spring, the barrier blades are tightly closed. A second spring is provided between the barrier driver plate and the base to push both of the two barrier blades through the barrier interlocking plate 2. A through hole and a cutout are formed in the barrier driver plate at positions which do not interfere with the opening and closing loci of the barrier blades. The first and second springs are arranged in the through hole and the cutout, respectively.

9 Claims, 6 Drawing Sheets

LENS BARRIER MECHANISM FOR USE IN A CAMERA

BACKGROUND OF THE INVENTION

1. Field of the Invention

The present invention relates to a lens barrier mechanism for use in a camera, openably and closably attached at a front side of a taking lens for protecting the taking lens.

2. Description of the Prior Art

A lens barrier mechanism of this type is disclosed by the present applicant in Japanese Laid-open Patent Application No. H4-34709. In this prior art lens barrier mechanism, as shown in FIG. 1, two barrier blades 3' arranged on the same level and a driver ring 4' for driving the blades 3' are arranged to overlap each other on a substantially disk-shaped base member 1' having an aperture 10' at its center. The barrier blades 3' and the driver ring 4' are held between a lens barrel (not shown) and the base member 1'.

A first spring 5' is arranged between the driver ring 4' and each of the barrier blades 3'. The driver ring 4' is rotated until the first springs 5' are overcharged so that the two barrier blades 3' are pressed against each other, thereby closing the barrier blades 3' tight enough to substantially completely prevent dust from coming into the lens barrel at a collapsed position.

To prevent the aperture 10' of the base member 1' from being inadvertently closed during photographing, a second spring 6' is arranged between the driver ring 4' and the base member 1' to always push the driver ring 4' in a direction to open the barrier blades 3'.

Moreover, in another prior art, a presser plate is provided as a means for holding the two barrier blades 3' and the driver ring 4' to overlap each other. The barrier blades 3' and the driver ring 4' are held between the presser plate and the base member 1'.

In the above-described prior art lens barrier mechanisms, however, since the two barriers 3' are separately driven by receiving a rotation force from the driver ring 4', the first spring 5' should be provided between the driver ring 4' and each of the blades 3'. Thus, in the prior art mechanisms, two first springs 5' arranged between the driver ring 4 and the barrier blades 3' and one second spring 6, i.e. a total of three springs are required.

In addition, since these springs have to be extension springs, under present circumstances, it cannot be helped to use coiled springs occupying considerable space. For this reason, the prior art mechanisms in which the coiled springs are incorporated to lie on the base member 1' is inevitably large in dimension along the optical axis, which makes it impossible to reduce the size of the barrier mechanism. A mechanism requiring the presser plate like the latter prior art mechanism is of great bulk with a greater thickness because of the thickness of the presser plate.

SUMMARY OF THE INVENTION

An object of the present invention is to reduce the thickness of a lens barrier mechanism by reducing the number of springs from the conventional number three to two and by decreasing the dimension of the lens barrier mechanism along the optical axis by efficiently arranging the springs.

To achieve the above-mentioned object, a lens barrier mechanism of the present invention is provided with a barrier blade arranged in front of a lens for opening and closing a photographic optical path, a barrier driver plate for driving said barrier blade, a spring for pushing said barrier blade in a predetermined direction. In said barrier driver plate, a space constituted by a cutout or a through hole is formed at a position which does not interfere with an opening and closing locus of said barrier blade and wherein said spring is arranged in the space.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
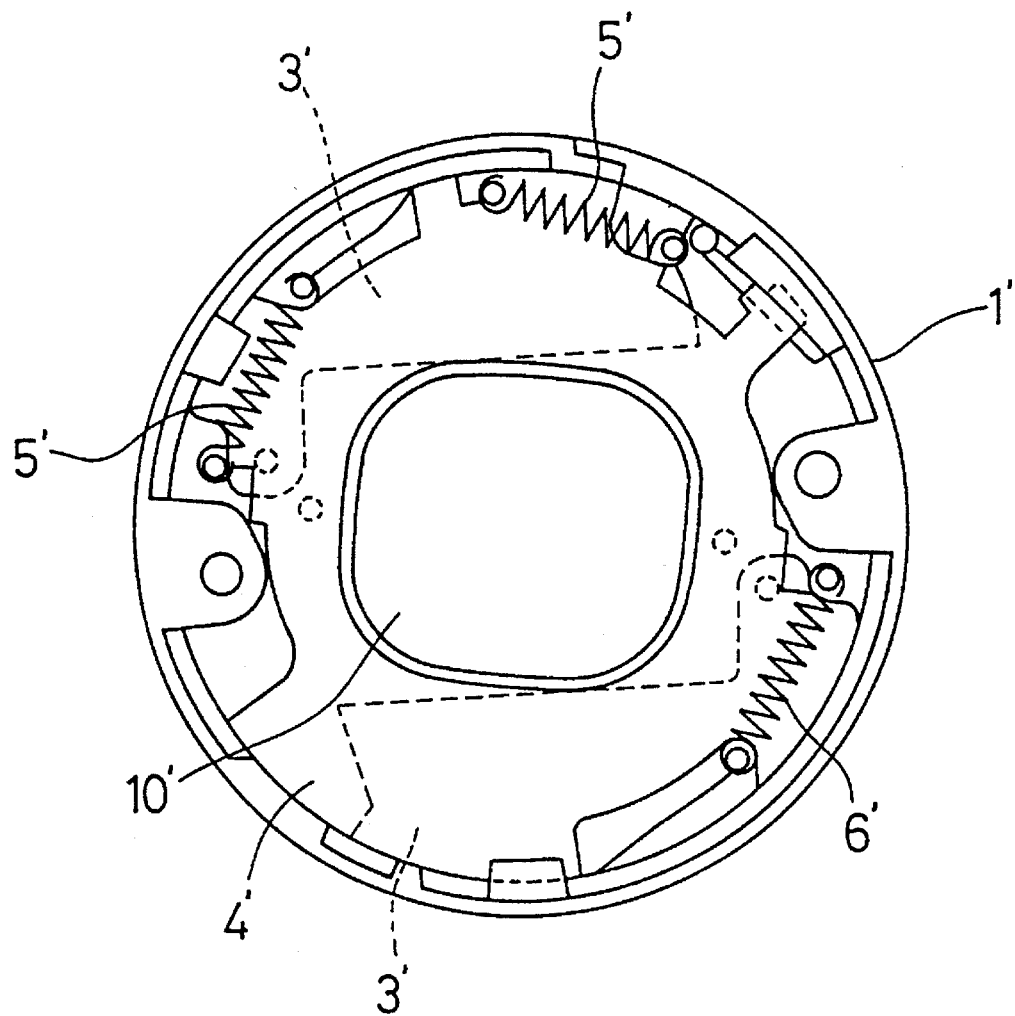
FIG. 1 is a front view showing a conventional lens barrier mechanism.
Figure 2:
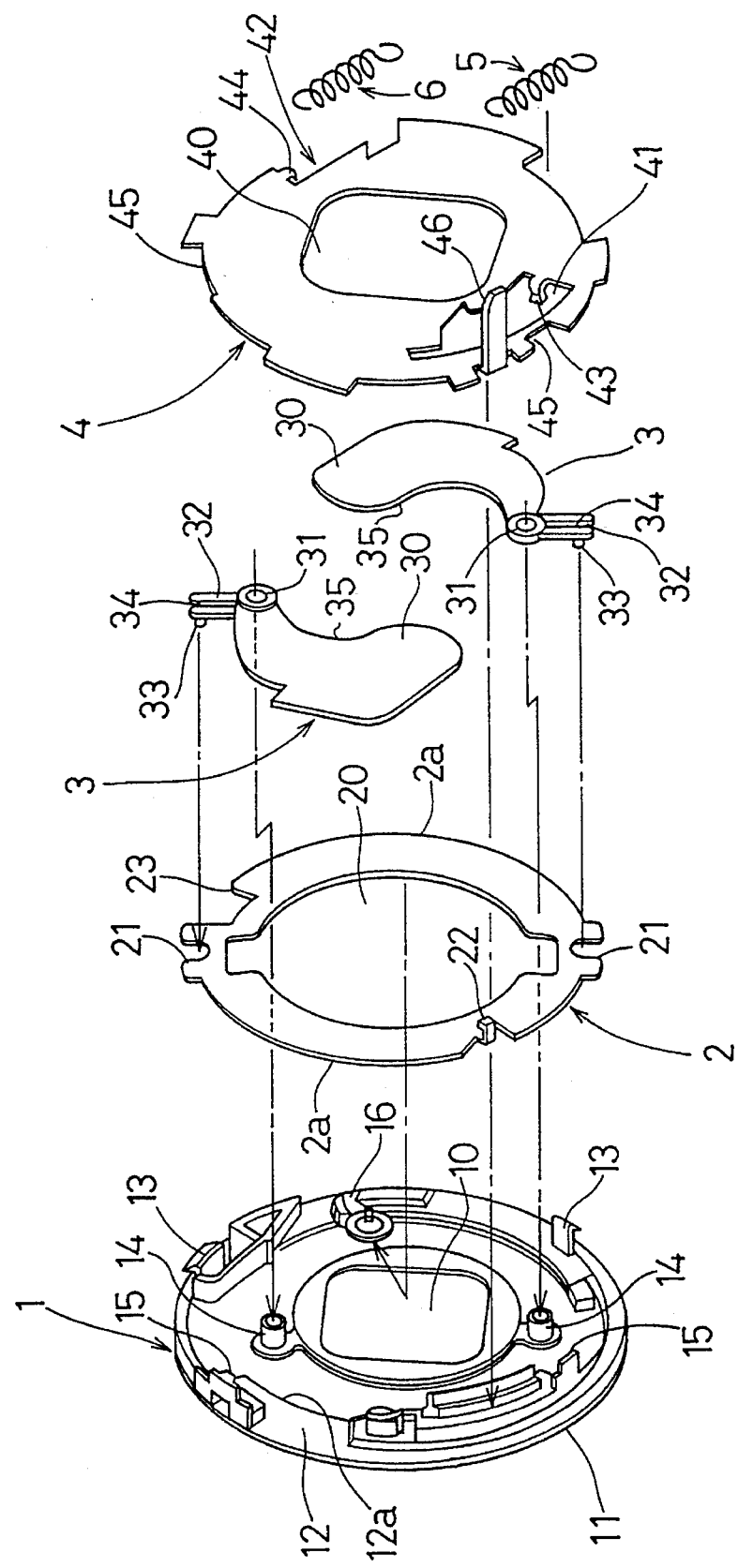
FIG. 2 is an exploded perspective view showing a lens barrier mechanism according to an embodiment of the present invention.

Hereinafter, an embodiment of the present invention will be described with reference to the drawings. FIG. 2 show each part of a lens barrier mechanism according to the embodiment in a disassembled condition. The lens barrier mechanism of FIG. 2 includes a base 1, a barrier interlocking plate 2, a pair of barrier blades 3, a barrier driver plate 4, and first and second springs 5 and 6 which are coiled extension springs.

Figure 3:
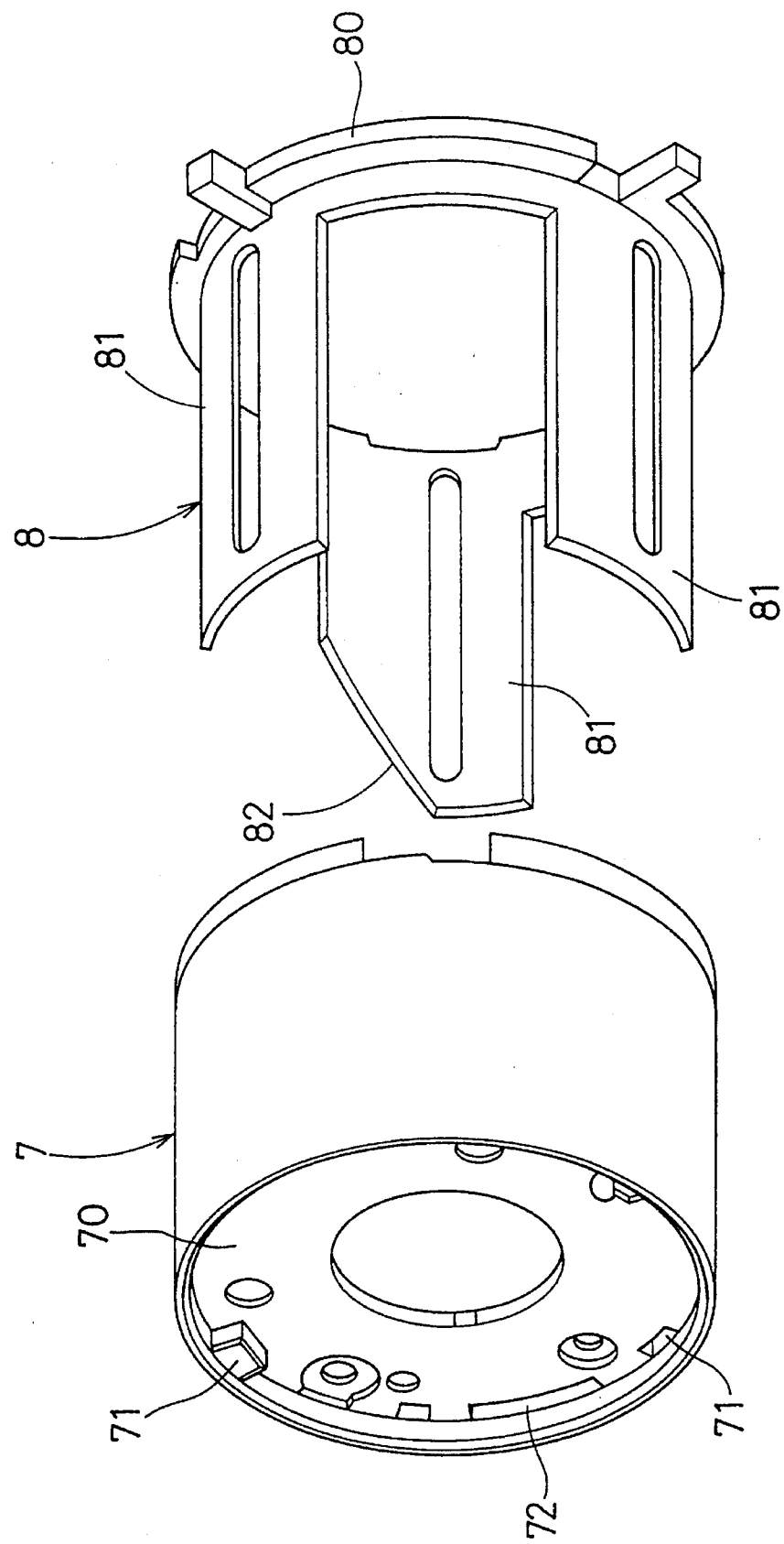
FIG. 3 is an exploded perspective view showing a relevant portion of a lens barrel on which the mechanism according to the embodiment is mounted.

FIG. 3 shows an external barrel 7 and an inner barrel 8 engaging with the external barrel 7 slidably along the optical axis. The external and internal barrels 7 and 8 constitute a lens barrel for a taking lens to which the lens barrier of the present embodiment is attached. In FIG. 3, to show relevant elements of the external and internal barrels 7 and 8, they are turned about the optical axis at 180° to the lens barrier mechanism of FIG. 2.

The base 1 is constituted by a disk-shaped front plate 11 having an aperture 10 at its center and a peripheral wall 12 formed integrally with the plate 11 to protrude rearward from the periphery thereof. On the peripheral wall 12, two engagement claws 13 are formed with a necessary distance between. On the external barrel 7 of the lens barrel, claw catchers 71 are formed on the periphery of its front plate 70.

In the lens barrier mechanism of the above-described structure, the barrier blades 3, the barrier interlocking plate 2 and the barrier driver plate 4 are arranged to overlap one another in this order on the base 1, and the first and second springs 5 and 6 are arranged at subsequently-described predetermined positions, respectively. By engaging the claws 13 of the base 1 with the claw catchers 72 under this condition, the lens barrier mechanism is attached to a front end of the external barrel 7 while its separation therefrom is prevented.

The barrier interlocking plate 2 is formed to be of a flat annular shape having an aperture 20 at its center so that the aperture 10 of the base 1 is not interfered with. By engaging peripheral surfaces 2a constituting most of its periphery with an inner periphery of the peripheral wall 12 of the base 1, the barrier interlocking plate 2 is held rotatively about the optical axis.

The two barrier blades 3 have the same dimensions and are made by using molding parts of the same configuration. Each has a boss hole 31 at the base of a blade member 30. An arm 32 extends from the boss hole 31 at a predetermined angle to the blade member 30.

The barrier blades 3 are arranged on the same level. The boss holes 31 are pivotally engaged with cylindrical bosses 14 protruding from the rear surface of the front plate 11 of the base 1, and protrusions 33 provided at the front ends of the arm 32 are engaged with U-shaped cutouts 21 formed to be opposite to each other with respect to the optical axis of the barrier interlocking plate 2. Thereby, the barrier blades 3 pivot about the cylindrical boss 14 of the base 1 in accordance with the rotation of the barrier interlocking plate 2 between a closed position where the opposing fringes 35 of the blades 30 are brought into contact with each other to close the aperture 10 of the base 1 from the opened position where the blades 30 are retreated from the aperture 10.

The barrier driver plate 4 is formed to be substantially disk-shaped with an aperture 40 of a configuration similar to that of the aperture 10 of the base 1 at its center. At portions of the barrier driver plate 4 which are opposite to each other with respect to the optical axis and that do not interfere with the opening and closing loci of the barrier blades 3, a through hole 41 formed to be substantially fan-shaped along the periphery and a cutout 42 opening the periphery are provided. At an end surface of the through hole 41 along the diameter and at an end surface of the cutout 42, a spring holder 43 and an abutment member 44 which also serves as a spring holder are respectively provided to protrude forward while being bent.

The first spring 5 is arranged between the spring holder 43 provided at the through hole 41 and a spring holder 22 provided to protrude rearward to oppose the spring holder 43, thereby connecting the barrier interlocking plate 2 and the barrier driver plate 4 through the first spring 5. Under this connection condition, an end surface of a cutout 23 formed in the barrier interlocking plate 2 is pushed by the first spring 5 in a direction to abut the abutment member 44 of the barrier driver plate 4.

At two positions on the periphery of the barrier driver plate 4, engagement cutouts 45 are formed. At the peripheral wall 12 of the base 1, bayonet claws 15 are formed to protrude rearward. By engaging the engagement cutouts 45 of the barrier driver plate 4 with the bayonet claws 15, the barrier driver plate 4 is held by the base 1 to be slidingly rotatable about the optical axis while being prevented from falling off in a direction along the optical axis.

The second spring 6 is arranged between the abutment member 44 of the barrier driver plate 4 and a spring holder 16 provided on the periphery of the base 1 to protrude rearward to oppose the abutment member 44. The barrier driver plate 4 is pushed by the second spring 6 to rotate clockwise in FIG. 2. Thus, the cutout 23 receives a pushing force from the abutment member 44 so that the barrier interlocking plate 2 is pushed to rotate clockwise, thereby pushing the barrier blades 3 to retreat from the aperture 10 of the base 1 to the opened position.

Figure 4:
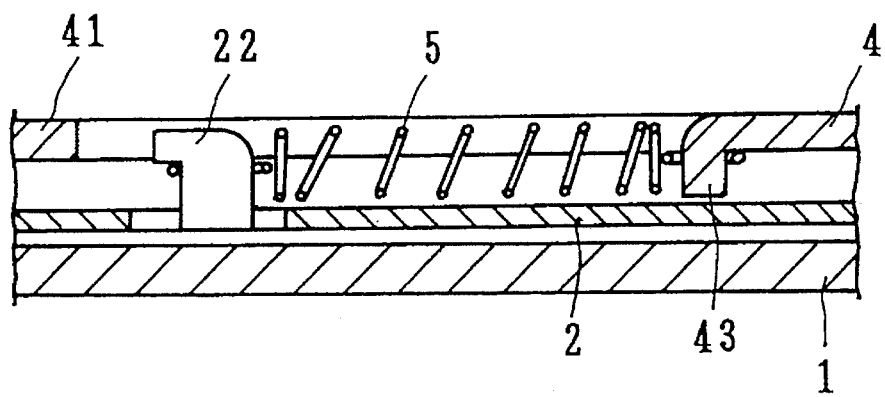
FIG. 4 is an enlarged cross-sectional view showing a first spring arranged in the lens barrier mechanism according to the embodiment.
Figure 5:
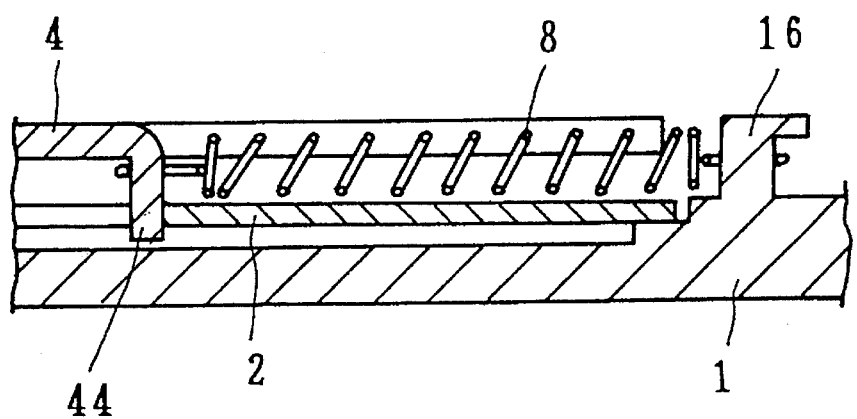
FIG. 5 is an enlarged cross-sectional view showing a second spring arranged in the lens barrier mechanism according to the embodiment.

In the lens barrier mechanism thus assembled, the first spring 5 is arranged in a space formed by the through hole 41 of the barrier driver plate 4 as shown in FIG. 4, and the second spring 6 is arranged in a space formed by the cutout 42 of the barrier driver plate 4 as shown in FIG. 5. As a result, the first and second springs 5 and 6 are substantially neatly incorporated in the overlapping structure of the base 1, the barrier interlocking plate 2, the barrier blades 3 and the barrier driver plate 4. Thus, different from the conventional structures where the springs are arranged to lie on the base, the reduction in thickness of the lens barrier mechanism is achieved efficiently.

At a portion on the periphery of the barrier driver plate 4 in the vicinity of the through hole 41, a cam follower 46 is formed to protrude rearward. On the periphery of an annular base plate 80 of the internal barrel 8 shown in FIG. 3, three sliding guide members 81 are provided to be spaced substantially equally. One of the sliding guide members 81 has an inclining cam surface 82 formed by cutting a part of a corner thereof. On the periphery of the front plate 70 of the external barrel 7, an arc hole 72 into which the cam follower 46 of the barrier driver plate 4 is inserted is formed.

When the lens barrier mechanism is attached to the front end of the lens barrel, the cam follower 46 is inserted through the hole 72 of the external barrel 7 so that its tip is slidingly in contact with the inclining cam surface 82 of the internal barrel 8 inserted in the external barrel 7.

Figure 6:
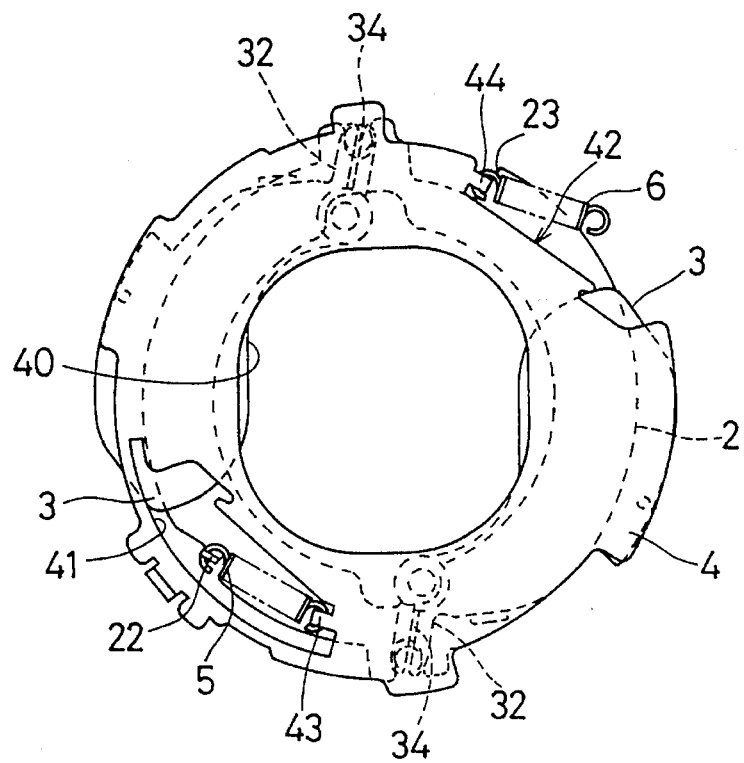
FIG. 6 is a front view showing an opened condition of barrier blades.
Figure 7:
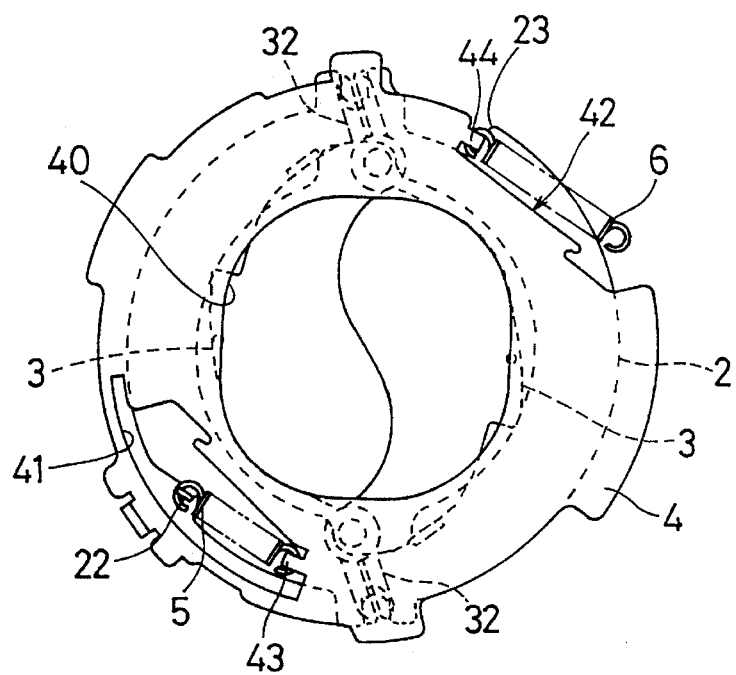
FIG. 7 is a front view showing a closed condition of the barrier blades.
Figure 8:
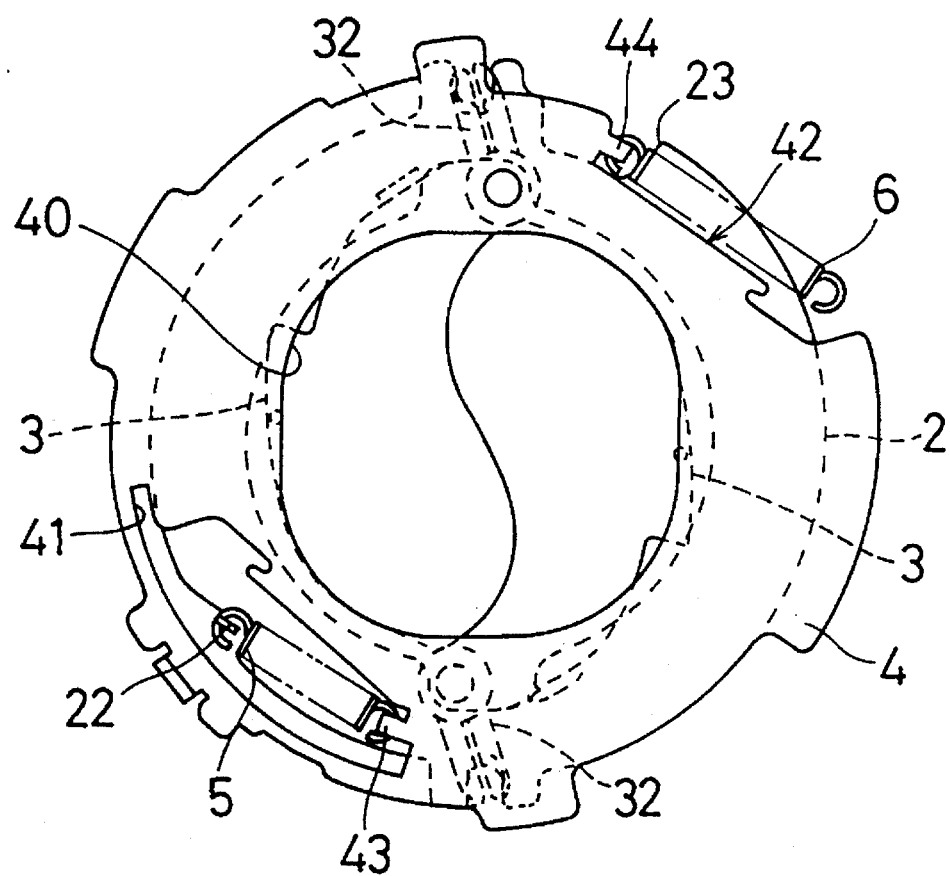
FIG. 8 is a front view showing an overcharged condition of the barrier blades.

FIGS. 6 to 8 show operation conditions of the lens barrier mechanism of the above-described structure. FIG. 6 shows the opened condition. FIG. 7 shows the condition of the moment the barrier blades 3 are closed. FIG. 8 show an overcharged condition. The base 1 is not shown in these figures. When the lens barrel is projecting, for example, when the focal length is shortest, the internal barrel is at a retreated position, and the inclining cam surface 82 thereof has no effect on the cam follower 46.

Under this condition, as shown in FIG. 6, the clockwise pushing force of the second spring 6 working on the barrier driver plate 4 is transmitted to the barrier interlocking plate 2 by the abutment of the abutment member 44 on the end surface of the cutout 23 to push the barrier interlocking plate 2 to rotate clockwise, thereby forcibly placing the barrier blades 3 at the opened position where the blades 3 are retreated from the aperture 10 of the base 1.

When this condition is changed to the collapsed condition where the camera is not used, for example, by turning on the main switch of the camera, the degree of engagement between the external and internal barrels 7 and 8 along the optical axis increases. Since the inclining cam surface 82 of the external barrel 8 pushes the cam follower 46 of the barrier driver plate 4 to move along the optical axis as the degree of engagement increases, the barrier driver plate 4 is rotated counterclockwise against the pushing force of the second spring 6, and in response to the rotation, the barrier interlocking plate 2 connected with the barrier driver plate 4 by the first spring 5 rotates counterclockwise, thereby rotating the barrier blades 3 about the cylindrical boss 14 toward the closed position.

Then, as shown in FIG. 7, when the opposing sides of the barrier blades 3 come into contact with each other, the rotations of the barrier blades 3 and the barrier interlocking plate 2 are stopped. However, the retraction of the external and internal barriers 7 and 8 into the camera body is continued thereafter, and the inclining cam surface 82 further rotates the cam follower 46 so that only the barrier driver plate 4 is rotated until it is slightly separated from the end surface of the cutout 23 of the barrier interlocking plate 2 while over-charging the first spring 5. Finally, a closed condition is maintained where the barrier blades 3 are pressed hard against each other as shown in FIG. 8.

As described above, in the collapsed condition where the camera is not used, the barrier blades 3 are always maintained in the closed condition. Thereby, the front lens is covered with the barrier blades 3. As a result, the intrusion of dust is prevented without failure. Even if an external force is applied to rotate the barrier driver plate 4 from the closed condition of the barrier blades 3, it only stretches the first spring 5; no excessive force is applied directly to the barrier blades 3. Conversely, even if a force to forcibly open the closed barrier blades 3 is applied to the barrier blades 3, since the force is absorbed by the first spring 5, no excessive force is applied to the barrier blades 3 and other parts.

When the lens barrel is projected from the collapsed position, since the inclining cam surface 82 is relatively retreated from the cam follower 46, the force is removed which works to keep the barrier driver plate 4 at the closed position of the barrier blades 3. Therefore, the barrier driver plate 4 is rotated counterclockwise by the pushing force of the second spring 6. At this time, the end surface of the cutout 23 is pushed by the abutment member 44 to forcibly rotate the barrier interlocking 2, whereby the barrier blades 3 are opened and kept opened by the pushing force of the second spring 6.

In the lens barrier mechanism of the above structure, there is a possibility that a gap is generated between the abutting opposing sides of the barrier blades 3 due to the influences of a configuration error of the barrier blades 3 or a relative position error of the cylindrical boss 14 of the base 1 pivotally supporting the barrier blades 3 or a relative position error of the position of the engagement between the protrusion 33 and the cutout 21 of the barrier interlocking plate 2.

To prevent this, in this embodiment, a slit 34 opened at its end is formed in the arm 32 of each barrier blade 3 along the length of the arm 32. Because of the presence of the slit 34, the arm 32 is bent so that the remaining both sides thereof are in contact with each other by the strong pushing force generated when the first spring 5 is overcharged, thereby absorbing the above-mentioned various error elements to prevent the generation of the gap between the abutting opposing sides of the barrier blades 3.

As described above, according to the lens barrier mechanism of the present invention, the barrier blades are opened and closed by transmitting the drive of the barrier driver plate to the barrier blades through the barrier interlocking plate, and the first spring overcharged to secure the closed condition of the barrier blades is arranged between the barrier interlocking plate and the barrier driver plate and the pushing force of the spring is applied to the two barrier blades through the barrier interlocking plate. Therefore, different from the conventional mechanisms where the first spring is arranged between the driver ring corresponding to the barrier driver plate and each barrier blade, by arranging only one spring between the barrier interlocking plate and the barrier driver plate, the pushing force of the spring generated by the charge of the spring is caused to act on the barrier blades.

Since the number of necessary springs is reduced by one from the conventional number three, i.e. only one first spring and one second spring are necessary, not only the number of parts is reduced but also, and more importantly, spaces for arranging the springs are secured by providing a cutout or a through hole in the barrier driver plate. In the present invention, since the springs are arranged in corresponding spaces, the springs are substantially neatly incorporated in the overlapping structure of the base, the barrier interlocking plate, the barrier blades and the barrier driver plate. As a result, the thickness of the lens barrier mechanism is reduced efficiently.

The lens barrier mechanism is unnecessary optically. However, since it is unnecessary to increase the amount of collapse of the lens barrel from that necessitated by the optical parts because of the reduction in thickness of the lens barrier mechanism, the amount of collapse of the lens barrel is reduced to the minimum.

Further, since the aperture of the substrate can be arranged close to the lens because of the reduction in thickness of the barrier mechanism, the barrier mechanism can be employed for a relatively wide angle lens even if the diameter of aperture when the barrier blades are opened is small, thereby reducing the external diameter of the lens barrier mechanism.

Obviously, many modifications and variations of the present invention are possible in light of the above teachings. It is therefore to be understood that within the scope of the appended claims, the invention may be practiced other than as specifically described.

What is claimed is:

1. A lens barrier mechanism comprising:
   a barrier blade arranged in front of a lens for opening and closing a photographic optical path;
   a barrier driver plate for driving said barrier blade;
   a spring for pushing said barrier blade in a predetermined direction,
   wherein a space constituted by a cutout or a through hole is formed in said barrier driver plate at a position which does not interfere with an opening and closing locus of said barrier blade and wherein said spring is arranged in the space.

2. A lens barrier mechanism as claimed in claim 1, wherein a plurality of said barrier blades are provided and wherein one spring is provided as said spring which pushes said plurality of barrier blades.

3. A lens barrier mechanism as claimed in claim 2, further comprising a barrier interlocking plate for simultaneously driving said plurality of barrier blades, wherein said barrier blades are driven by transmitting a driving force of the barrier driver plate through the barrier interlocking plate.

4. A lens barrier mechanism as claimed in claim 3, further comprising a second spring for pushing said barrier interlocking plate, wherein said second spring is arranged in the space formed in the barrier driver plate.

5. A lens barrier mechanism as claimed in claim 1, further comprising a barrier interlocking plate, wherein said barrier blade is driven by transmitting a driving force of the barrier driver plate through the barrier interlocking plate.

6. A lens barrier mechanism comprising:
   a plurality of barrier blades pivotally arranged, on a base attached to an front end of a lens barrel of a camera, so that an aperture formed in a center of the base is opened and closed;
   a barrier driver plate connected to said barrier blades through a first spring and supported by said base so as to be rotatable about an optical axis; and a second spring arranged between said base and said barrier driver plate for pushing said plurality of barrier blades in a predetermined direction, wherein a space constituted by a cutout or a through hole is formed in said barrier driver plate at a position which does not interfere with an opening and closing locus of said barrier blade and wherein at least one of said first and second springs is arranged in the space.

7. A lens barrier mechanism as claimed in claim 6, wherein one spring is provided as said first spring.

8. A lens barrier mechanism as claimed in claim 7, further comprising a barrier interlocking plate for simultaneously driving said plurality of barrier blades, wherein said barrier blades are driven by transmitting a driving force of the barrier driver plate through the barrier interlocking plate.

9. A lens barrier mechanism as claimed in claim 6, further comprising a barrier interlocking plate for simultaneously driving said plurality of barrier blades, wherein said barrier blades are driven by transmitting a driving force of the barrier driver plate through the barrier interlocking plate.

* * * * *